US005247317A

United States Patent [19]

Corver et al.

[11] Patent Number: 5,247,317

[45] Date of Patent: Sep. 21, 1993

[54] PRINTING DEVICE WITH CONTROL OF DEVELOPER ROLLER SPACING

[75] Inventors: Jozef A. W. M. Corver, BC Nuenen; Antoon L. Hoep, DH Molenhoek; Robertus P. C. Quirijnen, LG Venlo, all of Netherlands

[73] Assignee: Oce-Nederland B.V., Ma Venlo, Netherlands

[21] Appl. No.: 988,801

[22] Filed: Dec. 10, 1992

[30] Foreign Application Priority Data

Dec. 12, 1991 [NL] Netherlands ........................ 9102074

[51] Int. Cl.[5] ...................... G01D 15/06; G03G 15/09

[52] U.S. Cl. .............................. 346/160.1; 346/153.1; 355/253; 355/245; 118/657; 118/658

[58] Field of Search ............... 118/623, 624, 647, 653, 118/657, 658; 355/245, 251, 253; 346/153.1, 160.1

[56] References Cited

U.S. PATENT DOCUMENTS

| | | | |
|---|---|---|---|
| 3,914,460 | 10/1975 | Maksymiak | 355/245 |
| 4,062,321 | 12/1977 | Greenig | 118/623 |
| 4,370,056 | 1/1983 | Hays | 355/245 |
| 4,531,832 | 7/1985 | Kroll et al. | 355/253 |
| 4,561,763 | 12/1985 | Basch | 355/211 |
| 4,791,882 | 12/1988 | Enoguchi et al. | 118/653 |
| 4,884,188 | 11/1989 | Berkhout et al. | 346/160.1 |
| 5,157,443 | 10/1992 | Anderson et al. | 355/256 |

OTHER PUBLICATIONS

Patent Abstracts of Japan, vol. 10, No. 225 (P-484) (2281) Aug. 6, 1986 and JP-A-61-061185, (TDK Corp) Mar. 28, 1986, abstract only.

Xerox Disclosure Journal, *Flexible Roll Shell* by Joseph Zelazny, vol. 1, No. 9/10, Sep./Oct. 1976.

*Primary Examiner*—Benjamin R. Fuller
*Assistant Examiner*—Randy W. Gibson
*Attorney, Agent, or Firm*—Birch, Stewart, Kolasch & Birch

[57] ABSTRACT

A printing device for reproducing information, comprising a movable image-forming element having a dielectric surface, an image-forming station including a magnetic roller provided with a rotatable electrically conductive sleeve and a magnetic system within the electrically conductive sleeve, electrodes to generate an electric field between the image-forming element and the magnetic roller in accordance with an information pattern, while an electrically conductive magnetically attractable toner powder is present in an image-development zone formed between the image-forming element and magnetic roller, the magnetic system generating a magnetic field in the image-forming zone and forming the toner powder into a magnetic toner brush and system for providing a well-defined space in the image-development zone between the electrically conductive sleeve and the image-forming element so that no distortion of the magnetic toner brush occurs during image development in the image-development zone.

7 Claims, 2 Drawing Sheets

PRINTING DEVICE WITH CONTROL OF DEVELOPER ROLLER SPACING

BACKGROUND OF THE INVENTION

1. Field of the Invention

The present invention relates to an electrostatic printing device for reproducing information, and more specifically to an electomagnetic printing device.

2. Description of the Related Art

A electromagnetic printing device of the kind herein under consideration is known from U.S. Pat. No. 4,884,188. The wall thickness of the electrically conductive sleeve of the magnetic roller of the printing device disclosed therein must be as thin as possible in order to minimize any distortion of the magnetic field in the image-forming or image-development zone. However, a thin wall-thickness for the magnetic roller sleeve means that the roller is of relatively low rigidity so that the sleeve vibrates during rotation. Such vibrations cause changes in the distance between the surface of the sleeve of the magnetic roller and the image-forming element of the printing device at the image-forming zone therebetween so that the magnetic toner brush formed there by the magnetic developer powder does not remain satisfactorily in position. This results in lack of uniformity in image-development. Also, the degree of sleeve vibration varies over the length of the magnetic roller so that the magnetic toner brush does not extend rectilinearly transversely of the direction of transport of the image-forming element, but extends along a curved line continually changing shape. As a result, the toner particles of the developer powder do not reach the image-forming element at the correct location, and this is visible as image defects on the copy.

SUMMARY OF THE INVENTION

Therefore, it is an object of the present invention to provide a novel electromagnetic printing device which will overcome the above-mentioned disadvantages.

It is a further object of the present invention to provide an electromagnetic imaging system which provides for the uniform development of electrically formed latent images.

The foregoing objects and others are accomplished in accordance with the present invention, generally speaking, by providing a movable image-forming element having a dielectric surface, an image-development station at which a magnetic roller is disposed having a rotatable electrically conductive sleeve near the surface of the image-forming element, so as to form an image-forming zone therebetween, a first means to generate an electric field between the image-forming element and the magnetic roller in accordance with an information pattern, while an electrically conductive magnetically attractable toner powder is present in the image-forming zone, and a means which generates a magnetic field in the image-forming zone, which second means comprises a magnetic system disposed stationary within the sleeve of the magnetic roller.

According to a first embodiment of the electrostatic printing device of the present invention, the electrically conductive sleeve of the magnetic roller comprises magnetizable components. As a result, the sleeve of the magnetic roller is attracted against the magnetic system under the influence of a magnetic field generated by the magnetic system. A well-defined distance is created and sustained in the image-development zone between the sleeve of the magnetic roller and the image-forming element so that no distortion of the magnetic toner brush formed by the magnetically attracted toner powder occurs.

The magnetic system is disposed inside the sleeve of the magnetic roller near the image-development zone at a given distance from the surface of the image-forming element, so that the sleeve of the magnetic roller is pulled against the magnetic system which also serves as a spacer means. The magnetic components of the sleeve of the magnetic roller may be provided, for example, by arranging the sleeve to have a layer of a soft-magnetic material or consist completely of such material.

In another embodiment of the electrostatic printing device according to the present invention, one or more contact-pressure elements may be provided to exert a normal force on the sleeve of the magnetic roller, so that the sleeve is brought into contact with the magnetic system in the image-forming zone. In this instance, the electrically conductive sleeve is non-magnetic.

In either of the embodiments described above, other spacer means other than the magnetic system may be disposed inside the sleeve of the magnetic roller near the image-forming zone at a given distance from the surface of the image-forming element. In the case of the first embodiment, the magnetized sleeve of the magnetic roller is pulled against the spacer means In accordance with the alternate embodiment, as a result of the normal force exerted on the sleeve by the contact-pressure elements, the sleeve is brought into contact with the spacer means in the image-forming zone.

BRIEF DESCRIPTION OF THE DRAWINGS

The invention is further explained in detail with reference to the following description and the accompanying drawings wherein.

DETAILED DISCUSSION OF THE INVENTION

Figure 1:
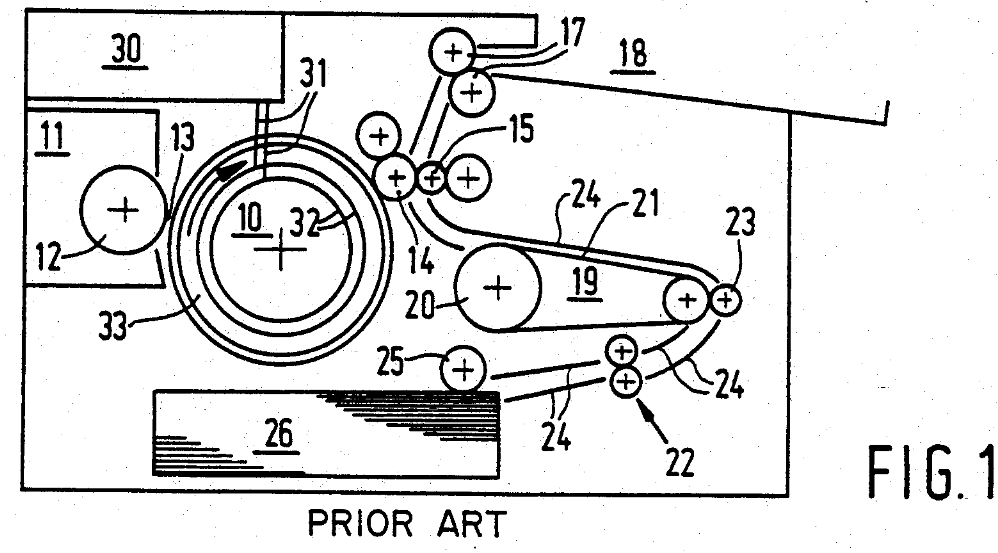
FIG. 1 PRIOR ART
FIG. 1 is a cross-section showing, in general, an electrostatic printing device.

FIG. 1 is an illustration showing, in general, an electrostatic printing device having a image-forming element in the form of a rotating drum 10, provided with an electrostatic layer built up from a number of controllable electrodes in and beneath a dielectric layer. A magnetic roller 12 is disposed in an image-development station 11 a short distance from the surface of the image-forming element 10 and comprises a rotatable electrically conductive sleeve and an internal stationary magnetic system. The rotatable sleeve of the magnetic roller 12 is covered with a uniform layer of an electrically conductive and magnetically attractable toner powder, which toner powder is brought into contact with the image-forming element 10 in an image-development zone 13. A powder image is developed on the image-forming element 10 by the application of a voltage between the magnetic roller 12 and one or more of the selectively controllable electrodes of the image-forming element 10. This developed powder image is subsequently transferred by the application of pressure to a heated rubber-covered roller 14. A sheet of paper is taken by roller 25 from the stockpile 26 and is fed via guideways 24 and rollers 22 and 23 to a heating station 19. Heating station 19 comprises a belt 21 running about a heated roller 20. The sheet of paper is heated by contact with the belt 21. The heated sheet is then fed between the rollers 14 and 15, the softened powder image present on the heated roller 14 being completely transferred to the sheet of paper. The temperatures of the belt 21 and the roller 14 are so adapted to one another that the image fuses to the sheet of paper. The sheet of paper thus provided with the toner powder image is fed via the transport rollers 17 to a collecting tray 18. Unit 30 comprises an electronic circuit which converts the optical information of an original into electrical signals which are fed to the controllable electrodes of the rotating drum 10, which are not shown in detail, via wires 31 having trailing contacts and conductive tracks 32 disposed in the insulating side wall of the image-forming element 10.

Figure 2:
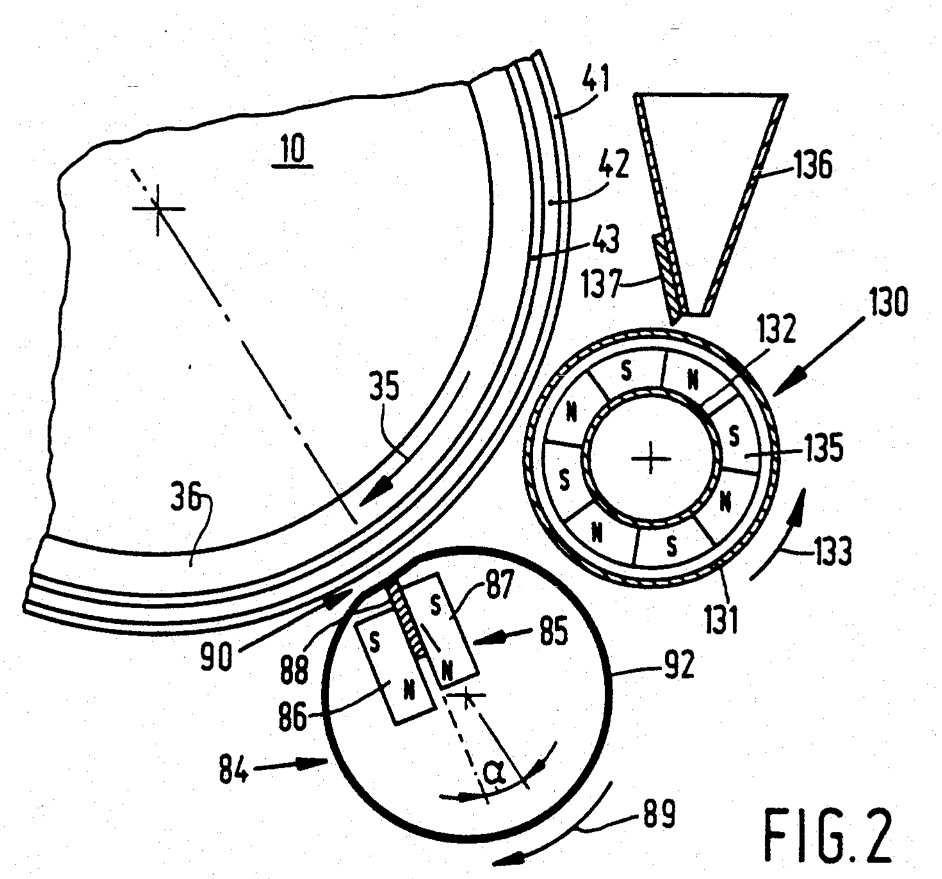
FIG. 2 is a magnified segmented cross-section of the development zone of a first embodiment of a printing device according to the present invention.

FIG. 2 is a segmented magnified cross-section of an image-forming element 10 in the form of a drum 36 rotatable in the direction of arrow 35 and provided with an insulating layer 43 on which are disposed a large number of adjacent and mutually insulated electrodes 42 which extend endlessly in the direction of movement of the drum, the electrodes 42 being covered by a dielectric layer 41. The magnetic roller 84 comprises a grounded electrically conductive sleeve 92 rotatable in the direction of arrow 89 about a magnetic system comprising a magnetic knife 85 consisting of a ferromagnetic blade 88 held between two magnets 86 and 87. The thickness of the ferromagnetic blade 88 is at least 0.4 mm in order to achieve the optimal magnetic flux in the material, up to a maximum thickness of about 4 mm, so limited for constructional reasons. The magnets 86 and 87, which are in contact with the blade 88 by like poles, generate a narrow magnetic field in the image-development zone 90, the field emerging from the end of the ferromagnetic blade 88 disposed a short distance from the sleeve 92. A uniform layer of conductive magnetic toner powder is applied to the dielectric layer 41 by means of a toner feed device inclusive of a toner reservoir 136 and a magnetic roller 130. The toner is deposited by the magnetic roller 130 which comprises a sleeve 131 of diamagnetic material, e.g. aluminum, brass or stainless steel. The sleeve 131 is mounted in a known manner for rotation about a shaft 132 and can be driven in the direction of arrow 133 by a drive means (not shown). A number of magnets 135 are mounted on the shaft 132 of the magnetic roller 130, the shaft 132 being fixed in the frame of the printing device. A homogeneous magnetic field is obtained at the surface of the diamagnetic sleeve 131 under the influence of the magnets 135. Magnetically attractable toner powder is applied to the sleeve 131 of the magnetic roller 130 from a reservoir 136 and is retained thereon by the magnetic field. On rotation of the sleeve 131 in the direction of arrow 133 a layer of the magnetically attractable toner powder, restricted to a given thickness by a scraper 137, is transported to a transfer zone between the image-forming element 10 and the magnetic roller 130. A uniform layer of toner powder is then formed or transferred to the dielectric layer 41 under the influence of an electric field applied in a known manner across the transfer zone. The magnets 135 of the magnetic roller 130 must, on the one hand, satisfy the requirement that the magnetic induction must be sufficiently high to generate a magnetic field on the surface of the sleeve 131 such that a layer of the toner powder is retained and entrained by the rotating sleeve 131 without causing dust problems. The magnetic induction is thus determined by toner powder parameters and the speed of revolution of the magnetic roller 130. On the other hand, the magnetic induction of the magnets must not be too high to enable the layer of toner powder to be readily transferred to the dielectric sleeve 41 in the transfer zone without a very strong electric field being required. These two contradictory requirements can be met in two ways. First, by using an optimal magnetic induction for the transfer function for the magnet 135 which determines the field strength in the transfer zone, and an optimal magnetic induction in respect of the toner transport function for all the other magnets. Of course, a compromise can be made in which case the same magnetic induction is used for all the magnets 135, this magnetic induction being a compromise for both functions. A further function of the magnetic roller 130 is that toner powder remaining on the sleeve 92 of the magnetic roller 84 after passing the image-development zone 90 is attracted by the magnetic field of the magnetic roller 130 back to the rotating sleeve 131 and is included in the layer of toner powder on roller 130. As described above, a layer of toner powder is transported to the image-development zone 90 via the image-forming element 10 in order to form a very narrow magnetic toner brush in the image-development zone 90 under the influence of the directional magnetic field.

To obtain the sharpest possible magnetic toner brush, the strongest possible magnetic field is required with a high magnetic gradient certainly on that side where the image-forming element 10 leaves the image-forming zone 90. To this end, the assembly comprising the blade 88 and magnets 86, 87 is disposed at an angle $\alpha$ with respect to a line connecting the centers of the drum 36 and sleeve 92. This angle $\alpha$ is between 0° and 20° and is preferably 10°. An additional way of achieving a sharp magnetic toner brush is for the magnets 86 and 87 to be disposed in mutually offset positions with respect to the blade 88 a shown in FIG. 2. In that case the magnet 87 is positioned much closer to the end of the blade 88 than the magnet 86. It has been found that a very strong magnetic field is obtained by using, for magnets 86 and 87, permanent magnets having a magnetic energy product $B \times H$ of at least 246 $kJ/m^3$, so that excellent results are obtained even using toners having weak magnetic properties. A material which satisfies this requirement for a suitable magnet is a neodymium-iron-boron alloy.

In order to limit as much as possible any distortion of the magnetic field in the image-development zone 90, the wall thickness of the sleeve 92 must be fairly thin, (e.g. 40–100 μm). A sleeve 92 having such a thin wall thickness may, however, vibrate during rotation so that distortion of the magnetic toner brush, which has been sharply defined by the steps indicated hereinabove, occurs and image errors may arise. In order to eliminate this problem a well-defined static distance between the sleeve 92 of the magnetic roller 84 and the image-forming element 10 is produced by applying a force to the sleeve 92 so that in the image-development zone 90, sleeve 92 bears against the end of the blade 88.

A first embodiment of maintaining this well-defined permanent or fixed distance between the sleeve 92 and the image-forming element 10 against the blade 88 is shown in FIG. 2. In this embodiment the sleeve 92 comprises magnetizable material so that the sleeve 92 is magnetized in the image-development zone under the influence of the magnetic field applied by the magnetic knife 85. The magnetized sleeve 92 experiences a force in the magnetic field in the image-development zone 90, the force pressing the sleeve 92 against the end of the magnetic blade 88 and holding it pressed against the same. The magnetizable components of the sleeve 92 preferably consist of a layer of soft-magnetic material, e.g. nickel, since soft-magnetic material is, on the one hand, rapidly magnetized under the influence of a magnetic field and, on the other hand, is also rapidly magnetically saturated, so that the configuration of the field lines of the magnetic field is no longer distorted. If a sleeve 92 is used which consists completely of nickel, with a wall thickness between 40 and 100 μm, good contact pressure is obtained against the end of the blade 88 with the embodiment described herein (as regards construction and magnetic specifications) for the magnetic knife 85. In this instance the magnetic knife itself serves as a spacer means or member.

The skilled artisan, of course, can very readily determine by experiment a different combination of the determining parameters (magnetizable materials, wall thickness and single-layer or multi-layer construction) for the sleeve 92 to give a sleeve 92 which is satisfactorily pressed against the blade 88 in a given magnetic field and is sufficiently rapidly magnetically saturated so as not to distort the configuration of the field lines. Such extensions of the present invention are herein incorporated as being within the scope of the instant disclosure.

Figure 3:
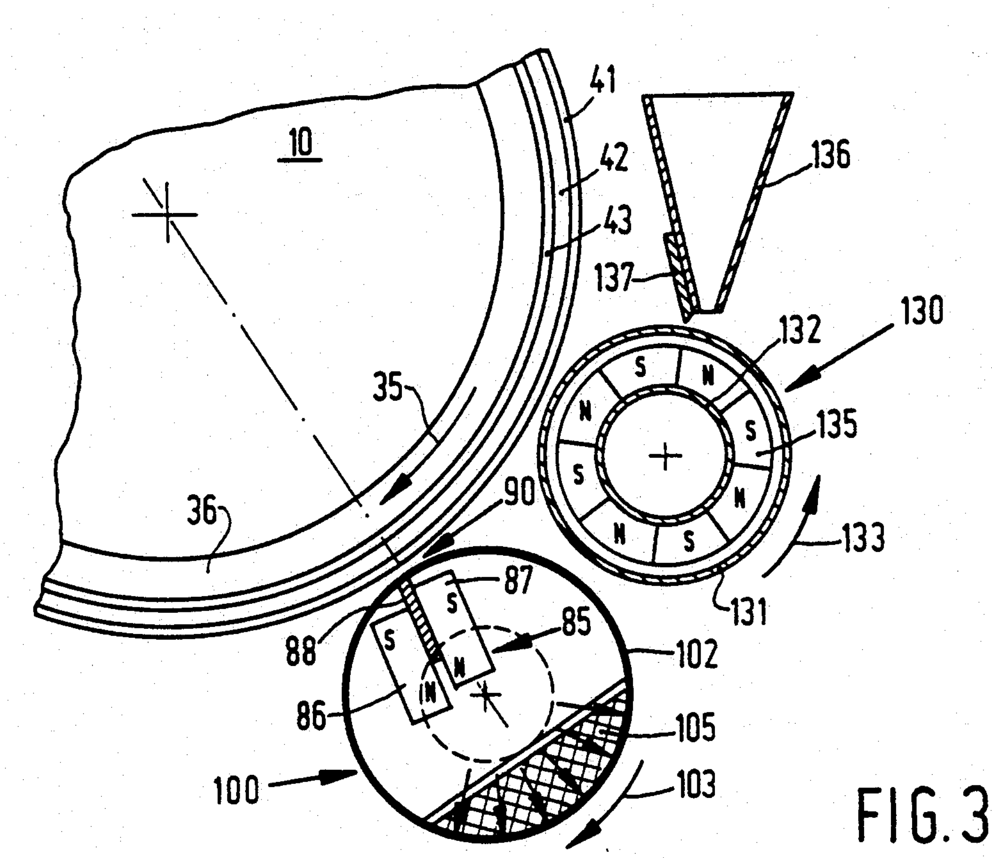
FIG. 3 is a magnified segmented cross-section of the development zone of a second embodiment of a printing device according to the present invention.

FIG. 3 shows a second embodiment of the electrostatic printing device according to the present invention wherein a contact-pressure means is provided to press the magnetic roller sleeve against the blade of the magnetic knife. Like parts in FIGS. 2 and 3 have like reference numerals. This second embodiment comprises a magnetic roller 100 consisting of an electrically conductive non-magnetic sleeve 102 rotatable in the direction of arrow 103 about the magnetic knife 85. A contact-pressure means in the form of a cylinder segment 105 is disposed inside the sleeve 102, the segment 105 being pressed outwardly by any suitable means known in the art so that the sleeve 102 is held against the end of the magnetic blade 88 in the image-development zone 90. The cylinder segment 105, which may consist of one complete segment or a number of segmented parts, can, for example, be pressed outwards by spring action or pneumatically. Herein, the blade 88 of the magnetic knife 85 serves as the spacer element.

Figure 4:
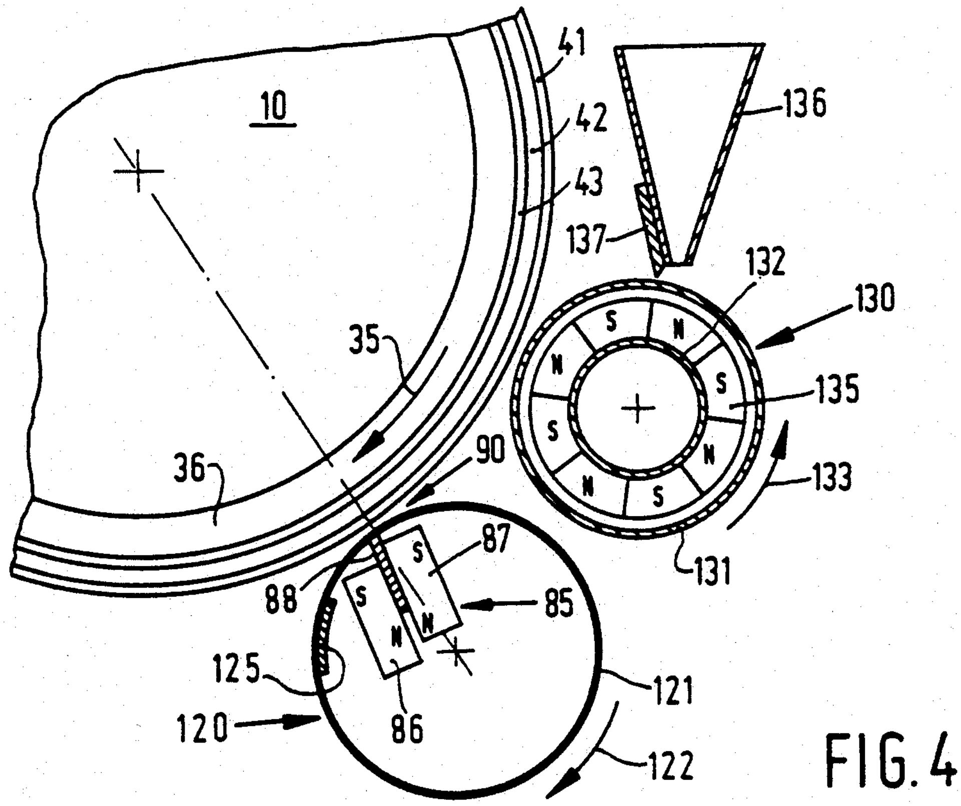
FIG. 4 is a magnified segmented cross-section of the development zone of a third embodiment of a printing device according to the present invention.

FIG. 4 shows a third embodiment of the printing device according to the present invention with yet another embodiment of the contact-pressure means for pressing the magnetic roller sleeve against the blade. Like parts in FIG. 2 and FIG. 3 have like reference numerals in this third embodiment. This third embodiment comprises a magnetic roller 120 consisting of an electrically conductive non-magnetic sleeve 121 rotatable in the direction of arrow 122 about the magnetic knife 85. As considered in the direction of rotation, a contact-pressure means 125, for example in the form of a curved strip, pressed by any conventional means against the inner wall of the sleeve 121, is provided within the sleeve 121 just before the image-development zone 90. In this case, any suitable means known in the art can be used to achieve this contact pressure. The normal force exerted on the sleeve 121 by means of the contact-pressure means 125 results in a frictional force between the contact-pressure means 125 and the sleeve 121. This tangentially directed frictional force on the sleeve 121 acts in the opposite direction to the driving force on the sleeve 121, so that the sleeve 121 of the magnetic roller 120 is pulled against the end of the magnetic blade 88 at the image-development zone 90.

Although the foregoing description relates to the application of a normal force to the sleeve of the magnetic roller from the inside in order to hold the sleeve against the blade of the magnetic knife 85, it will be clear to the skilled artisan that a force can also be applied to the sleeve from outside to produce the same result.

In order to avoid unnecessary distortion of the sleeves 102 and 121 during the time when the printing device is inoperative, the contact-pressure means 105 and 125, respectively, are preferably released from the sleeves 102 and 121 when the printing device is at rest. This can be achieved by any conventional means not shown in detail but known in the art.

Instead of using the blade 88 of the magnetic knife 85 facing towards the image-forming element 10 as the spacer element against which the sleeves 92, 102 and 121 bear, it is also possible to use other separate spacer means. Such spacer means may, for example, consist of elongate integral or divided support shafts or support members extending in an axial direction of the magnetic rollers 84, 100 and 120. Such spacer means would then be disposed near the end of the blade 88 within the sleeve of the magnetic roller at a predetermined distance from the surface of the image-forming element 10.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An electrostatic printing device, comprising a rotatable image-forming element having a dielectric surface, an image-development station including a magnetic roller provided with a rotatable electrically conductive sleeve juxtapositioned at the surface of said image-forming element, so as to form an image-development zone therebetween, and a magnetic system disposed stationary within said electrically conductive sleeve which generates a magnetic field in said image-development zone, and means to generate an electric field between said image-forming element an said magnetic roller in accordance with an information pattern, while an electrically conductive magnetically attractable toner powder is present in said image-development zone, wherein said electrically conductive sleeve of said magnetic roller comprises magnetizable components such that said electrically conductive sleeve is magnetically attracted to and bears against said magnetic system whereby a well-defined, static distance is fixed between said electrically conductive sleeve of said magnetic roller and said image-forming element thereby eliminating any vibrational effect on image development.

2. A printing device according to claim 1, further including at least one spacer disposed inside said sleeve of said magnetic roller near said image-development zone at a given distance from said surface of said image-forming element.

3. A printing device according to claims 1 or 2, wherein said sleeve of said magnetic roller comprises a layer of soft-magnetic material.

4. A printing device according to claims or 2, wherein said sleeve of said magnetic roller consists of a soft-magnetic material.

5. An electrostatic printing device, comprising a rotatable image-forming element having a dielectric surface, an image-development station including a magnetic roller provided with a rotatable electrically conductive sleeve juxtapositioned at the surface of said image-forming element, so as to form an image-development zone therebetween, and a magnetic system disposed stationary within said electrically conductive sleeve which generates a magnetic field in said image-development zone, means to generate an electric field between said image-forming element and said magnetic roller in accordance with an information pattern, while an electrically conductive magnetically attractable toner powder is present in said image-development zone, wherein at least one contact pressure element is provided to exert an outwardly directed normal force on said electrically conductive sheet of said magnetic roller, such that said electrically conductive sleeve is forced to and bears against said magnetic system whereby a well-defined, static distance is fixed between said electrically conductive sleeve of said magnetic roller and said image-forming element thereby eliminating any vibrational effect of image development.

6. A printing device according to claim 5, wherein said at least one contact pressure element is disposed inside said electrically conductive sleeve of said magnetic roller which can exert an outwardly directed normal force on said sleeve to maintain said well-defined static distance between said image-forming element and said sleeve.

7. A printing device according to claims 5 or 6, further including at least one spacer disposed inside said sleeve of said magnetic roller near said image-development zone at a given distance from said surface of said image-forming element.

* * * * *